(12) United States Patent
Umetani et al.

(10) Patent No.: US 7,022,433 B2
(45) Date of Patent: Apr. 4, 2006

(54) NEGATIVE ACTIVE MATERIAL, METHOD OF MANUFACTURING ITS MATERIAL, AND LEAD ACID BATTERY

(75) Inventors: Hirofumi Umetani, Takatsuki (JP); Ikumi Ban, Takatsuki (JP); Yoshihiro Eguchi, Takatsuki (JP)

(73) Assignee: GS Yuasa Corporation, Kyoto (JP)

( * ) Notice: Subject to any disclaimer, the term of this patent is extended or adjusted under 35 U.S.C. 154(b) by 359 days.

(21) Appl. No.: 10/381,282

(22) PCT Filed: Nov. 8, 2001

(86) PCT No.: PCT/JP01/09758

§ 371 (c)(1), (2), (4) Date: Mar. 24, 2003

(87) PCT Pub. No.: WO02/39519

PCT Pub. Date: May 16, 2002

(65) Prior Publication Data

US 2004/0053130 A1    Mar. 18, 2004

(51) Int. Cl.
*H01M 4/60* (2006.01)
*H01M 6/00* (2006.01)

(52) U.S. Cl. ..................... 429/212; 29/623.1

(58) Field of Classification Search ............. None
See application file for complete search history.

(56) References Cited

FOREIGN PATENT DOCUMENTS

| JP | 7147160 | 6/1995 |
|---|---|---|
| JP | 9007630 | 1/1997 |
| JP | 9147872 | 6/1997 |
| JP | 11121008 | 4/1999 |
| JP | 11204111 | 7/1999 |
| JP | 2001202987 | 7/2001 |

*Primary Examiner*—Michael Barr
*Assistant Examiner*—Robert Hodge
(74) *Attorney, Agent, or Firm*—Crowell & Moring LLP

(57) ABSTRACT

A negative active material is characterized by being prepared by adding a lignin having a unit structure represented by the formula (I) as the main structure to a lead oxide. Since the lignin of the formula (I) is added, the negative active material can be prevented from shrinkage due to charge/discharge.

formula (I)

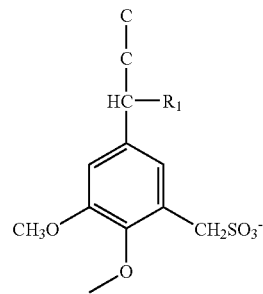

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOR, $SO_3H$, and $CH_2SO_3H$.)

11 Claims, No Drawings

NEGATIVE ACTIVE MATERIAL, METHOD OF MANUFACTURING ITS MATERIAL, AND LEAD ACID BATTERY

TECHNICAL FIELD

This invention relates to a negative active material, a method of manufacturing its material and a lead acid battery.

BACKGROUND OF THE INVENTION

A lead acid battery is being widely used for a power source for starting an automobile engine and a power source for supplying electric power to various electrical equipments. The lead acid battery includes such a problem that a high-rate discharge performance of a negative electrode is deteriorated earlier than that of a positive electrode when charge/discharge operations are repeated, so that a battery life is limited due to the negative electrode. The cause is supposed to be attributable to a fact that a negative active material shrinks due to charge/discharge to cause a decrease in a surface area of the negative active material. In order to dissolve the above problem, a negative active material becomes used which is prepared by adding a lignin having a unit structure represented by the formula (III) to a lead oxide.

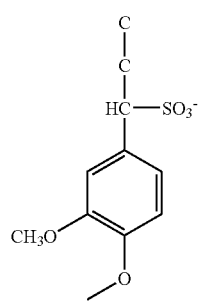

formula (III)

In this instance, the lignin is a component included in a wood, and is a by-product produced when manufacturing pulp in a paper making factory. Since there are many processes for manufacturing pulp, it can be said that there are so many kinds of the lignin corresponding to those processes. The lignin of the formula (III) is called lignosulfonate which is produced by a method of sulfite digesting. Since sulfurous acid is used in this method, sulfonic acid group is introduced into α-position of the side chain in the structure. The lignin of the formula (III) has a merit of large water-solubility, but has a demerit that it can not be modified easily.

On the other hand, a Pb—Sb alloy has conventionally been used for a positive electrode grid in the lead acid battery. However, a type of the lead acid battery using the Pb—Sb alloy includes such a problem that antimony in the alloy causes a lowering of a hydrogen over-voltage of the negative electrode, so that its maintenance becomes troublesome because a periodic supplement of water becomes required due to an increase of the electrolyte's decrease. For this reason, a hybrid type lead acid battery using the Pb—Sb alloy which has an antimony content half as much as a conventional battery, has been put in use. However, a calcium type lead acid battery using a Pb—Ca alloy is getting a large share in the market of the lead acid battery.

SUMMARY OF THE INVENTION

In the negative active material produced by adding the lignin of the formula (III) to the lead oxide, there has been such a problem that an effect by the lignin, i.e. an effect to dissolve an earlier deterioration of the high-rate discharge performance of the negative electrode, is weakened due to a gradual deterioration of the lignin. The lignin has been deteriorated remarkably because a temperature surrounding the battery arises up to about 70° C. in a summer season, particularly when the lead acid battery is put in a engine compartment of automobile.

While, in the calcium type lead acid battery, there is such a problem as an early decrease in a capacity of the positive electrode, because of producing a passive state on a surface between the positive electrode grid and the positive active material due to over-discharge standing and because of forming a $PbSO_4$ layer on a surface of the positive electrode grid due to repeating deep discharges. The hybrid type lead acid battery has included such a problem that the electrolyte's decrease becomes large to accelerate a battery deterioration particularly under a high-temperature environment, as compared with that of the calcium type lead acid battery. As a technology to dissolve such problems, the positive active material produced by adding antimony compound to the lead oxide is disclosed in the JP 7-147160 A. According to this technology, the cycle life performance of the positive electrode can be improved by adding the antimony compound of proper quantity. However, since an object of the above-mentioned technology is to improve the cycle life performance of the positive electrode, this is not effective for the lead acid battery in which the cycle life performance of the negative electrode is inferior to the cycle life performance of the positive electrode.

A first object of this application is to provide a negative active material which can improve a cycle life performance of a negative electrode.

A second object of this application is to provide a method of manufacturing a negative active material which can improve a cycle life performance of a negative electrode.

A third object of this application is to provide a lead acid battery which can improve a cycle life performance of the battery by improving cycle life performances of both a positive electrode and a negative electrode.

In order to accomplish the first object, the first invention of this application comprises a negative active material characterized by being prepared by adding a lignin having a unit structure represented by the formula (I) as the main structure to a lead oxide.

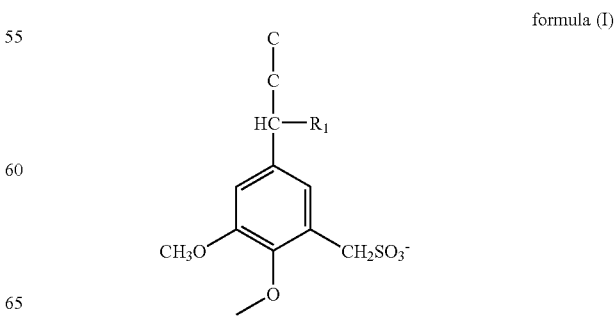

formula (I)

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

According to the first invention, the negative active material can be prevented from shrinkage due to charge/discharge because the lignin of the formula (I) is added to it. Since the lignin of the formula (I) is hard to be deteriorated even under a high-temperature environment, the effect to prevent the negative active material from shrinkage can be kept for a long period even under the high-temperature environment. Therefore, according to this invention, the worsening of a high-rate discharge performance of the negative electrode can be controlled for a long period even under the high-temperature environment. Consequently, the life performance of the negative electrode can be improved.

The lignin of the formula (I) is one in which a sulfonic acid group is introduced through methyl into an aromatic nucleus, and called sulfo-methylated lignin. This lignin can be obtained by introducing a sulfomethyl group into the aromatic nucleus of a kraft lignin. Sulfo-methylation is easily done by a treatment at high temperature using sodium sulfite and formaldehyde. The kraft lignin has a small molecular weight and a characteristic of being easily modified. The sulfo-methylation is only an example of modification. The kraft lignin is obtained by a kraft digesting. In the kraft digesting, sodium hydroxide and sodium sulfide are used and the sulfonic acid group is not introduced into the structure of the lignin. The kraft lignin is hard to be dissolved in water. However, the sulfo-methylated lignin has a characteristic of being easily dissolved in water.

The lignin of the formula (I) is most generally used as sodium salt, but may be used as potassium salt or other salts.

The reason why the lignin of the formula (I) is assigned as the main structure is that such a structure, in which one $CH_2SO_3^-$ exists in plural such fundamental structures connected each other, may be thought of.

In order to accomplish the first object, the second invention of this application comprises a negative active material characterized by being prepared by adding a lignin having a unit structure represented by the formula (II) as the main structure to a lead oxide.

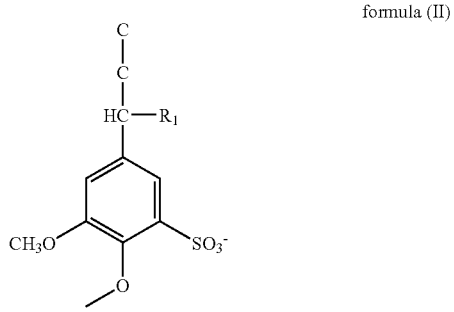

formula (II)

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

According to the second invention, the life performance of the negative electrode can be improved by virtue of its containing the lignin of the formula (II), in the same reason as the first invention.

The lignin of the formula (II) is one in which the sulfonic acid group is directly introduced into the aromatic nucleus. This lignin can be obtained by treating the kraft lignin using sodium hydroxide, sodium sulfite and potassium ferricyanide.

The reason why the lignin of the formula (I) is assigned as the main structure is that such a structure, in which one $SO_3^-$ exists in plural such fundamental structures connected each other, may be thought of.

It is preferable that the first and second inventions contain the following concept (A).

(A) An adding amount of the lignin ranges from 0.2 to 0.6 mass % relative to the lead oxide.

According to the concept (A), the life performance of the negative electrode can be improved effectively.

In order to accomplish the second object, the third invention of this application comprises a method of manufacturing a negative active material characterized by being provided with a process in which at least a lignin having a unit structure represented by the formula (I) as the main structure is added to a lead oxide.

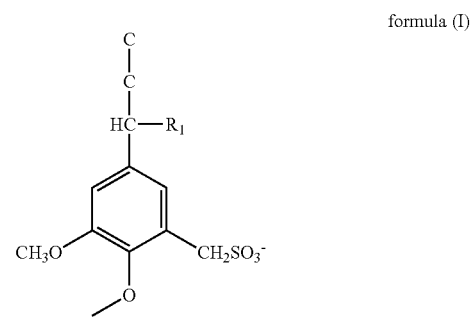

formula (I)

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

According to the third invention, the negative active material of the first invention can be obtained.

In order to accomplish the second object, the fourth invention of this application comprises a method of manufacturing a negative active material characterized by being provided with a process in which at least a lignin having a unit structure represented by the formula (II) as the main structure is added to a lead oxide.

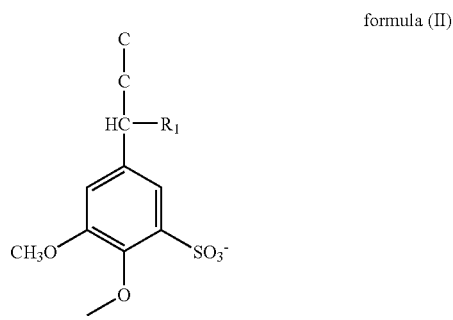

formula (II)

(wherein $R_1$ is H, OH, COOH, $SO_3H$, SH, $C_6H_5$, $COO^-$, $SO_3^-$, $R_2C_6H_4$, $(R_2)_2C_6H_3$ or $(R_2)_3C_6H_2$; and $R_2$ is at least one member selected from among OH, COOH, $SO_3H$, and $CH_2SO_3H$.)

According to the fourth invention, the negative active material of the second invention can be obtained.

It is preferable that the third and fourth inventions contain the following concept (B).

(B) An adding amount of the lignin ranges from 0.2 to 0.6 mass % relative to the lead oxide.

According to the concept (B), the negative active material improved effectively in its life performance can be obtained.

In order to accomplish the third object, the fifth invention of this application comprises a lead acid battery having positive electrodes and negative electrodes, in which a negative active material composing the negative electrode is characterized by being prepared by adding a lignin having a unit structure represented by the formula (I) as the main structure to a lead oxide.

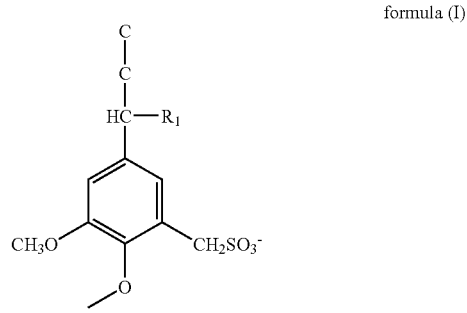

formula (I)

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

According to the fifth invention, the life performance of the negative electrode can be improved because the lignin of the formula (I) is added to the negative active material. Therefore, according to this invention, the life performance of the battery can be prevented from being limited by the negative electrode. For this reason, the life performance of the battery can be improved by using the positive electrode having a long life.

In order to accomplish the third object, the sixth invention of this application comprises a lead acid battery having positive electrodes and negative electrodes, in which a negative active material composing the negative electrode is characterized by being prepared by adding a lignin having a unit structure represented by the formula (II) as the main structure to a lead oxide.

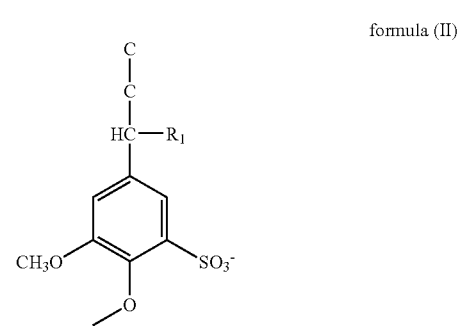

formula (II)

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

Even in the sixth invention, the life performance of the battery can be prevented from being limited by the negative electrode because the lignin of the formula (II) is added, in the same reason as the fifth invention.

It is preferable that the following concepts (C) & (D) are used in the fifth and sixth inventions.

(C) The positive electrode grid composing the positive electrode is comprised of a lead alloy which does not contain antimony.

According to the concept (C), electrolyte's decrease can be controlled further because the positive electrode grid is comprised of the lead alloy which does not contain the antimony. Therefore, troublesome maintenances such as supplying water etc. can be reduced.

Further, in the concept (C), it is preferable that the following concept (a) is used.

(a) The positive active material composing the positive electrode is prepared by adding antimony compound to a lead oxide, the added antimony compound is $Sb_2O_3$, $Sb_2O_5$, or a mixture of them, and an adding amount of the antimony compound ranges from 0.05 to 0.2 mass % relative to the lead oxide.

According to the concept (a), the formation of $PbSO_4$ layer on the surface between the positive electrode grid and the positive active material is controlled, because the positive electrode grid is comprised of the lead alloy which does not contain the antimony and the antimony compound is added to the positive active material, so that the life performance of the positive electrode can be improved. Consequently, the life performance of the battery can be improved further by combining with the improvement of the life performance of the negative electrode.

(D) An adding amount of the lignin ranges from 0.2 to 0.6 mass % relative to the lead oxide.

According to the concept (D), effects of the third and fourth inventions can be obtained effectively.

DETAILED DESCRIPTION OF THE PREFERRED EMBODIMENT

EXAMPLE 1

A lead acid battery was produced as follows.

Production of Negative Electrode

Manufacture of Negative Active Material

A lead oxide, a lignin, barium sulfate and an active material reinforcing agent were stirred and mixed to prepare a negative active material. An adding amount of the lignin was 0.2 mass % relative to the lead oxide, an adding amount of the barium sulfate was 1.2 mass % relative to the lead oxide, and an adding amount of the active material reinforcing agent was 0.03 mass % relative to the lead oxide. The active material reinforcing agent is a short fiber comprising polypropylene resin. The lignin is one having a unit structure represented by the formula (I) wherein $R_1$ is OH. The lignin of the formula (I) is used as sodium salt. Further, the lignin of the formula (I) is prepared by sulfomethylating a kraft lignin.

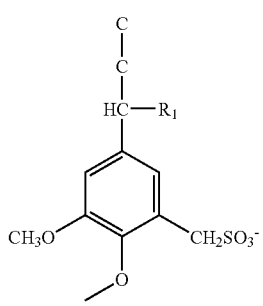

formula (I)

Production of Negative Electrode

Dilute sulfuric acid and water were kneaded together in the negative active material to prepare an active material paste. Then, the active material paste was filled in an expanded grid made of Pb—Ca—Sn alloy, cured and dried. Thereby, unformed negative electrodes were produced.

Production of Positive Electrode

Dilute sulfuric acid and water were kneaded together in a lead oxide to prepare an active material paste. Then, the active material paste was filled in an expanded grid made of Pb—Sb alloy, cured and dried. Thereby, unformed positive electrodes were produced.

Production of Lead Acid Battery

The positive electrode, the negative electrode and a separator made of polyethylene between them, were stacked to prepare an assembled element. This assembled element was inserted in a container made of polypropylene. Electrolyte comprised mainly of dilute sulfuric acid having a specific gravity of 1.28 (20° C.) was poured into the container so as to carry out case formation. Thus, a lead acid battery was produced.

EXAMPLES 2 to 4

Lead acid batteries were produced with the same procedures as those of Example 1, except that the adding amount of the lignin was varied as 0.4 mass %, 0.6 mass %, and 0.8 mass %. These batteries were named as Examples 2 to 4, in this order.

COMPARATIVE EXAMPLE 1

A lead acid battery was produced with the same procedures as those of Example 1, except that a lignin having a unit structure represented by the formula (III) was used and its adding amount was varied as 0.2 mass %. The lignin of the formula (III) was used as sodium salt. The reason why the adding amount of 0.2 mass % was selected was that the effect due to the lignin of the formula (III) was best result.

formula (III)

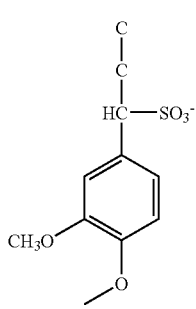

The lead acid batteries of Examples 1 to 4 and Comparative example 1 had a nominal specifications of 8 Ah (10 HR) and 12V.

Test 1

The lead acid batteries of Examples 1 to 4 and Comparative example 1 were subjected to cycle life tests under the following test conditions.

Test Conditions

Charge/discharge operations were repeated under such conditions as an ambient temperature of 75° C., a discharge current of 4.17A, a discharge time of 4 min., a charge current of 2.47A and a charge time of 10 min. Then, capacity tests were done every 480 cycles.

Capacity Test

The discharge operation was done at an ambient temperature of −18 ° C. with a current of 80 A, and a discharge capacity to reach a battery voltage of 6.0V was measured.

Result

Discharge capacities at 2,400 cycles and 4,800 cycles are listed in Table 1. In these batteries, a discharge capacity of Comparative example 1 is assumed as 100%.

TABLE 1

| Battery | Negative active material | | Life performance | |
|---|---|---|---|---|
| | Lignin (Chemical formula) | Adding amount (Mass %) | 2400 cycle: Discharge capacity (%) | 4500 cycle: Discharge capacity (%) |
| Example 1 | formula (I) | 0.2 | 104 | 108 |
| Example 2 | formula (I) | 0.4 | 109 | 112 |
| Example 3 | formula (I) | 0.6 | 105 | 107 |
| Example 4 | formula (I) | 0.8 | 104 | 102 |
| Comparative example 1 | formula (III) | 0.2 | 100 | 100 |

Consideration

The cycle life performances of the lead acid batteries of Example 1 to 4 were superior to that of the lead acid battery of Comparative example 1.

The lead acid batteries of Example 1 to 4 and Comparative example 1 were disassembled and examined after completion of 4,800 cycles, and the following facts became clear.

(1) In the lead acid battery of Comparative example 1, shrinkage of the negative active material proceeded.

(2) In the lead acid batteries of Example 1 to 4, deterioration of the negative electrodes as in case of Comparative example 1 was scarcely recognized. It can be thought that this is owing to the effect of the lignin.

(3) In the lead acid battery of Example 4, the accumulation of the lead sulfate due to the lack of the charge for the negative electrodes was recognized.

As seen from Examples 1 to 4 and Comparative example 1, the life performance of the lead acid battery can be improved when the negative active material is used, which is prepared by adding the lignin having the unit structure of the formula (I) to the lead oxide. It is preferable that the adding amount of the lignin ranges from 0.2 to 0.6 mass %.

EXAMPLE 5

A lead acid battery was produced with the same procedures as those of Example 1, only except for the following points.

(i) A material of the positive electrode grid made of Pb—Ca—Sn alloy was used.

(ii) A material having a unit structure represented by the formula (II) was used as the lignin in the negative active material. $R_1$ in the formula is OH. The lignin of the formula (II) was used as sodium salt. The adding amount was 0.2 mass % same as the case of Example 1.

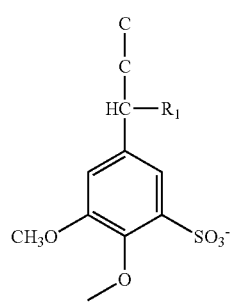

formula (II)

EXAMPLES 6 & 7

Lead acid batteries were produced with the same procedures as those of Example 5, except that the adding amount of the lignin was varied as 0.4 mass % and 0.6 mass % respectively. These batteries were named as Example 6 & 7, in this order.

COMPARATIVE EXAMPLE 2

A lead acid battery was produced with the same procedures as those of Example 5, except that a lignin having a unit structure represented by the formula (III) was used and its adding amount was varied as 0.2 mass %.

The lead acid batteries of Examples 5 to 7 and Comparative example 2 had a nominal capacity of 27Ah and positive electrode dimensions of a longitudinal length; 115 mm, a lateral length: 103 mm, and a thickness: 1.5 mm.

Test 2

The lead acid batteries of Examples 5 to 7 and Comparative example 2 were subjected to the cycle life tests under the following test conditions.

Test Conditions

Charge/discharge operations were done under such conditions as an ambient temperatures of 25° C. and 75° C., a discharge current of 25A, a discharge time of 4 min., a charge current of 25A, and a charge time of 10 min. Thereafter, a judgement discharge was done with a current of 272 A, so that the battery life was judged to be ended when a voltage after 30 seconds becomes below 7.2V.

Results are listed in Table 2. A cycle life number of the lead acid battery of Comparative example 2 at 75° C. is assumed as 100%.

TABLE 2

| | Negative active material | | Life performance | |
| | | | 25° C.: | 75° C.: |
| Battery | Lignin (Chemical formula) | Adding amount (Mass %) | Cycle life number (%) | Cycle life number (%) |
| Example 5 | formula (II) | 0.2 | 128 | 121 |
| Example 6 | formula (II) | 0.4 | 145 | 142 |
| Example 7 | formula (II) | 0.6 | 132 | 128 |
| Comparative example 2 | formula (III) | 0.2 | 110 | 100 |

Consideration

The cycle life performances of the lead acid batteries of Examples 5 to 7 were superior to those of the lead acid battery of Comparative example 2 even at an ordinary temperature of 25° C. and a high temperature of 75° C. Particularly, at the high temperature of 75° C., the life performances of the lead acid batteries of Examples 5 to 7 were superior to those of the lead acid battery of Comparative example 2 by about 21% to 42%.

The lead acid batteries of Examples 5 to 7 and Comparative example 2 were disassembled and examined after completion of the cycle life test at 75° C., and the following facts became clear.

(1) In the lead acid battery of Comparative example 2, the negative active material shrunk and the accumulation of the lead sulfate, i.e. so called as "sulfation", proceeded to cause a limitation of the battery life by the negative electrode.

(2) In the lead acid batteries of Examples 5 to 7, the battery life was expired by the deterioration of the positive electrodes and the deterioration of negative electrodes as occurred in Comparative example 2 was not recognized. It can be thought that this is owing to the effect of the lignin.

(3) In the lead acid batteries of Examples 5 to 7, the electrolyte's decrease of them was small as compared with the lead acid batteries of Examples 1 to 4.

As seen from Examples 5 to 7 and Comparative example 2, the life performance of the lead acid battery can be improved when the negative active material is used, which is prepared by adding the lignin having the unit structure represented by the formula (II) to the lead oxide. Particularly, the life performances at high temperature are excellent. It is preferable that the adding amount of the lignin ranges from 0.2 to 0.6 mass %. Since the positive electrode grid was made of the lead alloy which does not contain the antimony, the electrolyte's decrease can be controlled.

EXAMPLE 8

A lead acid battery was produced with the same procedures as those of Example 5, only except for the following points.

A lignin in which $R_1$ in the formula (II) is SH is used, and the adding amount was varied as 0.1 mass %.

EXAMPLES 9 to 12

Lead acid batteries were produced with the same procedures as those of Example 8, except that the adding amount of the lignin was varied as 0.2 mass %, 0.4 mass %, 0.6 mass % and 0.8 mass %, respectively. These batteries were named as Examples 9 to 12, in this order.

The lead acid batteries of Examples 8 to 12 had a nominal capacity of 27 Ah, and positive electrode dimensions of a longitudinal length: 115 mm, a lateral length: 103 mm, and a thickness: 1.5 mm.

Test 3

The lead acid batteries of Examples 8 to 12 were subjected to the cycle life tests same as that of the test 2.

Results are listed in Table 3. A cycle life number of the lead acid battery of Comparative example 2 at 75° C. was assumed as 100%.

TABLE 3

| Battery | Negative active material | | Life performance | |
|---|---|---|---|---|
| | Lignin (Chemical formula) | Adding amount (Mass %) | 25° C.: Cycle life number (%) | 75° C.: Cycle life number (%) |
| Example 8 | formula (II) | 0.1 | 109 | 110 |
| Example 9 | formula (II) | 0.2 | 143 | 152 |
| Example 10 | formula (II) | 0.4 | 145 | 160 |
| Example 11 | formula (II) | 0.6 | 128 | 148 |
| Example 12 | formula (II) | 0.8 | 118 | 125 |

Consideration

The cycle life performances of the lead acid batteries of Examples 8 to 12 were superior to those of the lead acid battery of Comparative example 2 even at an ordinary temperature of 25° C. and a high temperature of 75° C. Particularly, at the high temperature of 75° C., the life performances of the lead acid batteries of Examples 8 to 12 were superior to those of the lead acid battery of Comparative example 2 by about 10% to 60%.

The lead acid batteries of Examples 8 to 12 were disassembled and examined after completion of the cycle life test at 75° C., and the following facts became clear.

(1) In the lead acid batteries of Examples 8 to 12, the battery life was expired by the deterioration of the positive electrodes and the deterioration of the negative electrodes as occurred in Comparative example 2 was not recognized. It can be thought that this is owing to the effect of the lignin.

(2) In the lead acid batteries of Examples 8 to 12, the electrolyte's decrease of them was small as compared with the lead acid batteries of Examples 1 to 4.

As seen from Examples 8 to 12 and Comparative example 2, the life performance of the lead acid battery can be improved when the negative active material is used, which is prepared by adding the lignin having the unit structure represented by the formula (II) to the lead oxide. Particularly, the life performances at high temperature are excellent. The life performance at high temperature can be improved further in the lead acid battery using the lignin in which $R_1$ in the formula (II) is SH, as compared with the lead acid battery using the lignin in which $R_1$ is OH. Since the positive electrode grid was made of the lead alloy which does not contain the antimony, the electrolyte's decrease can be controlled.

In order to examine an optimum adding amount of an antimony compound when adding the antimony compound to the positive active material, lead acid batteries of Comparative examples 3 to 9 were produced.

COMPARATIVE EXAMPLE 3

A lead acid battery was produced as follows.

Production of Negative Electrode

Dilute sulfuric acid and water were kneaded together in a lead oxide to prepare an active material paste. Then, the active material paste was filled in an expanded grid made of Pb—Ca—Sn alloy, cured and dried. Thereby, unformed negative electrodes were obtained.

Production of Positive Electrode

A lead oxide and $Sb_2O_3$ were stirred and mixed together to prepare an active material. An adding amount of the $Sb_2O_3$ relative to the lead oxide was 0.05 mass %. Then, the active material, dilute sulfuric acid and water were kneaded together to prepare an active material paste. Thereafter, the active material paste was filled in an expanded grid made of Pb—Ca—Sn alloy, cured and dried. Thereby, unformed positive electrodes were produced.

Production of Lead Acid Battery

A lead acid battery was produced in the same as Example 1.

COMPARATIVE EXAMPLES 4 to 8

Lead acid batteries were produced with the same procedures as those of Comparative example 3, except that the adding amount of the $Sb_2O_3$ was varied as 0.1 mass %, 0.2 mass %, 0.3 mass %, 0.4 mass %, and 0.5 mass %, respectively. These batteries were named as Comparative examples 4 to 8, in this order.

COMPARATIVE EXAMPLE 9

A lead acid battery was produced with the same procedures as those of Comparative example 3, except that the $Sb_2O_3$ was not added. The lead acid batteries of Comparative examples 3 to 9 had a nominal capacity of 27 Ah, and positive electrode dimensions of a longitudinal length: 115 mm, a lateral length: 103 mm, and a thickness: 1.5 mm.

Test 4

The lead acid batteries of Comparative examples 3 to 9 were subjected to the cycle life tests under the following test conditions.

Test Conditions

Charge/discharge operations were done under such conditions as an ambient temperatures of 75° C., a discharge current of 25 A, a discharge time of 4 min., a charge current of 25 A, and a charge time of 10 min. Then, discharge was done for more than 56 hours on every 480 cycles. Thereafter, a judgement discharge was done with a current of 272 A, so that the battery life was judged to be ended when a voltage after 30 seconds became below 7.2V.

Results are listed in Table 4. A cycle life number of the lead acid battery of Comparative example 9 is assumed as 100%.

TABLE 4

| Battery | Adding amount of $Sb_2O_3$ (Mass %) | Cycle life number (%) |
|---|---|---|
| Comparative example 3 | 0.05 | 103 |
| Comparative example 4 | 0.1 | 110 |
| Comparative example 5 | 0.2 | 107 |
| Comparative example 6 | 0.3 | 79 |
| Comparative example 7 | 0.4 | 62 |
| Comparative example 8 | 0.5 | 55 |
| Comparative example 9 | 0 | 100 |

Consideration

The lead acid batteries of Comparative examples 3 to 5 were superior to the lead acid battery of Comparative example 9 in the cycle life performances. It can be thought that this is owing to the effect of the antimony compound added to the positive active material. On the other hand, the electrolyte's decrease became large in proportion to the adding amount of the antimony compound, and the electrolyte's decrease of the lead acid batteries of Comparative examples 6 to 8 became twice or more as large as that of the lead acid battery of Comparative example 9. For this reason, the life performances of the lead acid batteries of Comparative examples 6 to 8 were bad.

Similar results were obtained when $Sb_2O_5$ was used in place of the $Sb_2O_3$.

The lead acid batteries of Comparative examples 3 to 5 were disassembled and examined after completion of the cycle life test, and the following facts became clear.

In the lead acid batteries of Comparative examples 3 to 5; the positive electrodes were deteriorated a little, the negative active material shrunk, and the accumulation of lead sulfate, i.e. so called "sulfation" proceeded, thereby causing the limitation of the battery life by the negative electrode.

As seen from Comparative examples 3 to 9, the life performance of the positive electrode can be improved when the antimony compound is added to the positive active material by 0.05 to 0.2 mass %. Particularly, the most suitable adding amount was 0.1 mass %.

EXAMPLE 13

A lead acid battery was produced as follows.

Production of Negative Electrode

A negative electrode was produced in the same procedures as those of Example 1. The adding amount of the lignin was 0.2 mass %.

Production of Positive Electrode

A positive electrode was produced in the same procedures as those of Comparative example 3, except that the adding amount of the $Sb_2O_3$ was varied as 0.1 mass %.

Production of Lead Acid Battery

A lead acid battery was produced in the same procedures as those of Example 1.

EXAMPLE 14 & 15

Lead acid batteries were produced in the same procedures as those of Example 13, except that the adding amount of the lignin was varied as 0.4 mass % and 0.6 mass %, respectively. These batteries were named as Examples 14 and 15, in this order.

COMPARATIVE EXAMPLE 10

A lead acid battery was produced in the same procedures as those of Example 13, except that a negative electrode was produced in the same procedures as those of Comparative example 2 and a positive electrode was produced in the same procedures as those of Example 13.

Test 5

The lead acid batteries of Examples 13 to 15 and Comparative example 10 were subjected to the cycle life tests under the same conditions as those of the test 4.

Results are listed in Table 5. A cycle life number of the lead acid battery of Comparative example 9 was assumed as 100%.

TABLE 5

| | Negative active material | | |
|---|---|---|---|
| Battery | Lignin (Chemical formula) | Adding amount (Mass %) | Cycle life number (%) |
| Example 13 | formula (I) | 0.2 | 125 |
| Example 14 | formula (I) | 0.4 | 142 |
| Example 15 | formula (I) | 0.6 | 130 |
| Comparative example 10 | formula (III) | 0.2 | 110 |

Consideration

The cycle life performances of the lead acid batteries of Examples 13 to 15 were superior to those of the lead acid battery of Comparative example 10 by about 25% to 42%.

The lead acid batteries of Examples 13 to 15 and Comparative example 10 were disassembled and examined after completion of the cycle life test, and the following facts became clear.

(1) In the lead acid battery of Comparative example 10, the negative active material shrunk and the accumulation of lead sulfate, i.e. so called as "sulfation", proceeded to cause the limitation of battery life by the negative electrode.

(2) In the lead acid batteries of Example 13 to 15, the deterioration of the negative electrodes as occurred in Comparative example 10 was not recognized. It can be thought that this is owing to the effect of the lignin.

(3) In the lead acid batteries of Example 13 to 15, the electrolyte's decrease of them was small as compared with the lead acid batteries of Examples 1 to 4.

As seen from the above-mentioned description, in the lead acid batteries of Examples 13 to 15, the life performance of the positive electrode can be improved because the antimony compound is added to the positive active material and the life performance of the negative electrode can be improved too because the lignin of the formula (I) is added to the negative active material. Consequently, the life performance of the battery can be improved further. It is preferable that the adding amount of the lignin ranges from 0.2 to 0.6 mass %. In addition, since the positive electrode grid made of the lead alloy which does not contain the antimony, the electrolyte's decrease can be controlled.

Comparing the lead acid batteries of Examples 13 to 15, the lead acid battery of Example 14 is most excellent in its life performance. For this reason, in Examples 16 to 18, the adding amount of the antimony compound in the positive electrode was varied using the same negative electrode as that of Example 14.

EXAMPLES 16 to 18

Lead acid batteries were produced in the same procedures as those of Example 14, except that the adding amount of the $Sb_2O_3$ was varied as 0.05 mass %, 0.2 mass %, and 0.3 mass %, respectively. Tease batteries were named as Examples 16 to 18, in this order.

Test 6

The lead acid batteries of Examples 16 to 18 were subjected to the cycle life tests under the same conditions as those of the test 4.

Results are listed in Table 6. A cycle life number of the lead acid battery of Comparative example 9 is assumed as 100%.

TABLE 6

| Battery | Adding amount of $Sb_2O_3$ (Mass %) | Negative active material | | Cycle life number (%) |
| | | Lignin (Chemical formula) | Adding amount (Mass %) | |
| --- | --- | --- | --- | --- |
| Example 16 | 0.05 | formula (I) | 0.4 | 133 |
| Example 17 | 0.2 | formula (I) | 0.4 | 138 |
| Example 18 | 0.3 | formula (I) | 0.4 | 101 |

Consideration

The cycle life performances of the lead acid batteries of Examples 16 to 18 were superior to those of the lead acid battery of Comparative example 9. Particularly, the life performances of the lead acid batteries of Examples 16 and 17 were superior to those of the lead acid battery of Comparative example 11 by about 25% to 42%. Therefore, as obvious from Examples 14, 16 and 17, the adding amount of the antimony compound to the positive active material preferably ranges from 0.05 to 0.2 mass %.

The lead acid batteries of Examples 16 to 18 were disassembled and examined after completion of the cycle life test, and the following facts became clear.

(1) In the lead acid batteries of Example 16 to 18, the deterioration of the positive electrode were not recognized. It can be thought that this is owing to the effect of the antimony compound. However, the accumulation of lead sulfate in the negative active material, i.e. "sulfation", proceeded in proportion to the adding amount of the antimony compound.

(2) In the lead acid batteries of Example 16 to 18, the electrolyte's decrease of them was small as compared with the lead acid batteries of Examples 1 to 4.

As seen from the above-mentioned description, in the lead acid batteries of Examples 16 to 18, the life performance of the positive electrode can be improved because the antimony compound is added to the positive active material and the life performance of the negative electrode can be improved too because the lignin of the formula (I) is added to the negative active material. Consequently, the life performance of the battery can be improved further. Particularly, the life performance can be improved further more, when the adding amount of the antimony compound ranges from 0.05 to 0.2 mass %. In addition, since the positive electrode grid made of the lead alloy which does not contain the antimony, the electrolyte's decrease can be controlled.

ANOTHER EXAMPLES (1) The same results were obtained in the above-mentioned Examples, even when the lignin of the formula (II) was used in place of the lignin of the formula (I), or even when the lignin of the formula (I) was used in place of the lignin of the formula (II).

(2) $R_1$ in the formula (I) or $R_1$ in the formula (II) is not limited to the above-mentioned OH or SH. They may be H, COOH, $SO_3H$, $C_6H_5$, $COO^-$, $SO_3^-$, $R_2C_6H_4$, $(R_2)_2C_6H_3$, or $(R_2)_3C_6H_2$. $R_2$ is at least one member selected from among OH, COOH, $SO_3H$, and $CH_2SO_3$. The same results were obtained in the above-mentioned Examples even in these cases.

INDUSTRIAL APPLICABILITY

The negative active materials and the lead acid batteries of this application can be extremely improved in their life performances, so that they can provide a considerable industrial applicability.

What is claimed is:

1. A negative active material, comprising:
a lead oxide, and
a lignin having a unit structure represented by the formula (I) as the main structure.

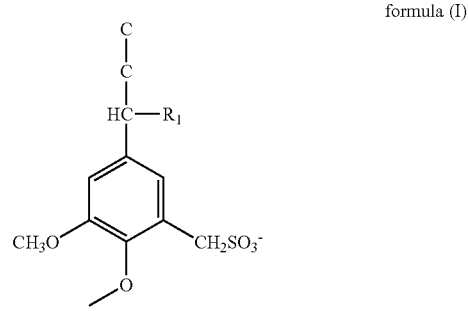

formula (I)

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

2. A negative active material, comprising:
a lead oxide, and
a lignin having a unit structure represented by the formula (II) as the main structure.

formula (II)

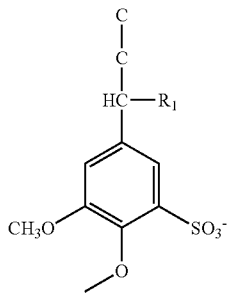

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

3. A negative active material as set forth in claim 1 or 2, in which an amount of the lignin ranges from 0.2 to 0.6 mass % relative to the lead oxide.

4. A method of manufacturing a negative active material, comprising the step of adding at least a lignin having a unit structure represented by the formula (I) as the main structure to a lead oxide.

formula (I)

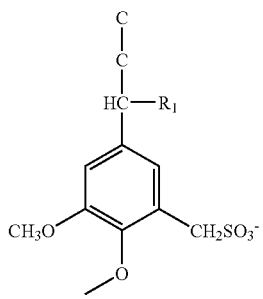

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

5. A method of manufacturing a negative active material, comprising the step of adding at least a lignin having a unit structure represented by the formula (II) as the main structure to a lead oxide.

formula (II)

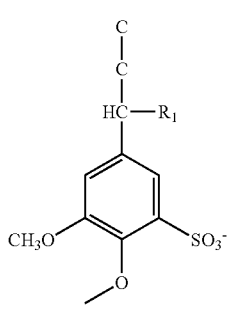

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

6. A method of manufacturing a negative active material as set forth in claim 4 or 5, in which an adding amount of the lignin ranges from 0.2 to 0.6 mass % relative to the lead oxide.

7. A lead acid battery having a positive electrode and a negative electrode,
in which a negative active material composing the negative electrode is comprised of a lead oxide and a lignin having a unit structure represented by the formula (I) as the main structure.

formula (I)

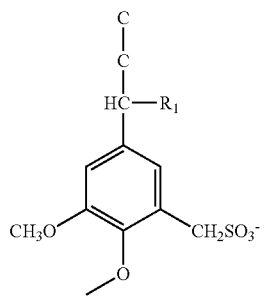

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

8. A lead acid battery having a positive electrode and a negative electrode,
in which a negative active material composing the negative electrode is comprised of a lead oxide and a lignin having a unit structure represented by the formula (II) as the main structure.

formula (II)

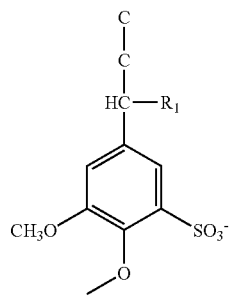

(wherein $R_1$ is H, OH, COOH, $SO_3H$, SH, $C_6H_5$, $COO^-$, $SO_3^-$, $R_2C_6H_4$, $(R_2)_2C_6H_3$, or $(R_2)_3C_6H_2$; and $R_2$ is at least one member selected from among OH, COOH, $SO_3H$, and $CH_2SO_3H$.)

9. A lead acid battery as set forth in claim 7 or 8,
in which a positive electrode grid composing the positive electrode made of a lead alloy which does not contain an antimony.

10. A lead acid battery as set forth in claim 9,
in which the positive active material composing the positive electrode is comprised of a lead oxide and an antimony compound, the antimony compound is $Sb_2SO_3$, $Sb_2SO_5$ or a mixture of them, and its amount ranges from 0.05 to 0.2 mass % relative to the lead oxide.

11. A lead acid battery as set forth in claim 7 or 8,
in which an amount of the lignin ranges from 0.2 to 0.6 mass % relative to the lead oxide.

* * * * *